(12) United States Patent
Ide et al.

(10) Patent No.: US 8,450,955 B2
(45) Date of Patent: May 28, 2013

(54) ALTERNATING-CURRENT MOTOR CONTROL APPARATUS

(75) Inventors: Kozo Ide, Fukuoka (JP); Shinya Morimoto, Fukuoka (JP); Sungmin Kim, Seoul (KR); Seung-ki Sul, Seoul (KR)

(73) Assignees: Kabushiki Kaisha Yaskawa Denki, Kitakyushu-Shi (JP); Sungmin Kim, Gyeonggi-Do (KR); Seung-Ki Sul, Seoul (KR)

( * ) Notice: Subject to any disclaimer, the term of this patent is extended or adjusted under 35 U.S.C. 154(b) by 443 days.

(21) Appl. No.: 12/778,991

(22) Filed: May 12, 2010

(65) Prior Publication Data

US 2010/0308757 A1   Dec. 9, 2010

(30) Foreign Application Priority Data

May 13, 2009   (JP) ............... P. 2009-116108

(51) Int. Cl.
*H02P 21/00*   (2006.01)
(52) U.S. Cl.
USPC ..................... 318/400.02; 318/432
(58) Field of Classification Search
USPC .............. 318/400.02, 727, 801, 432, 434
See application file for complete search history.

(56) References Cited

U.S. PATENT DOCUMENTS

| | | | | |
|---|---|---|---|---|
| 5,532,571 A * | 7/1996 | Masaki et al. | ............... | 318/809 |
| 6,264,005 B1 * | 7/2001 | Kang et al. | ............... | 187/290 |
| 6,396,229 B1 * | 5/2002 | Sakamoto et al. | ....... | 318/400.02 |
| 6,501,243 B1 * | 12/2002 | Kaneko et al. | ............... | 318/700 |
| 6,781,333 B2 * | 8/2004 | Koide et al. | ............... | 318/432 |
| 7,453,231 B2 * | 11/2008 | Maruyama et al. | ........... | 318/807 |
| 7,514,896 B2 * | 4/2009 | Imura et al. | ............... | 318/718 |
| 2004/0201358 A1 * | 10/2004 | Kawaji et al. | ............... | 318/701 |
| 2007/0222406 A1 * | 9/2007 | Atarashi et al. | ............... | 318/494 |
| 2007/0278986 A1 * | 12/2007 | Okamura | ............... | 318/798 |
| 2008/0157709 A1 * | 7/2008 | Tobari et al. | ............... | 318/801 |
| 2008/0297099 A1 * | 12/2008 | Maekawa | ............... | 318/799 |

FOREIGN PATENT DOCUMENTS

| | | |
|---|---|---|
| JP | 2000-209886 | 7/2000 |
| JP | 2003-259680 | 9/2003 |
| JP | 2008-167566 | 7/2008 |

OTHER PUBLICATIONS

Chinese Office Action for corresponding CN Application No. 201010172792.2, Jun. 4, 2012.

* cited by examiner

*Primary Examiner* — Rina Duda
(74) *Attorney, Agent, or Firm* — Ditthavong Mori & Steiner, P.C.

(57) ABSTRACT

An alternating-current motor control apparatus includes an inverter unit, a current-command divider, a current controller, a torque-variation calculator, and a phase angle generator. The current-command divider is configured to divide a command current amplitude into command current components based on a phase-angle command value that is a sum of the phase angle and an alternating current signal. The torque-variation calculator is configured to calculate a motor electric power based on the command voltage and either the motor current or the command current components and to calculate a torque variation based on the motor electric power. The phase angle generator is configured to generate a phase angle based on the torque variation.

18 Claims, 9 Drawing Sheets

ALTERNATING-CURRENT MOTOR CONTROL APPARATUS

CROSS-REFERENCE TO RELATED APPLICATION

The present application claims priority under 35 U.S.C. §119 to Japanese Patent Application No. 2009-116108, filed May 13, 2009. The contents of this application are incorporated herein by reference in their entirety.

BACKGROUND OF THE INVENTION

1. Field of the Invention

The present invention relates to an alternating-current motor control apparatus.

2. Description of the Related Art

Maximum torque control is known as a method for efficiently driving a motor having magnetic saliency. In maximum torque control, a maximum torque is generated for a constant output current. An output current command is divided into current command components for a d-axis current (current that influences magnetic flux) and a q-axis current (current that influences a torque), and current control is performed on the basis of the current command components that are divided from each other. When $I_s$ is a current amplitude, $L_d$ is a d-axis inductance, $L_q$ is a q-axis inductance, and $\Phi_a$ is an induced voltage constant, an optimum current phase angle $\beta$ (phase angle between a q-axis and a current vector) that satisfies the maximum torque condition is calculated as follows:

$$\beta = \sin^{-1}\left(\frac{-\Phi_a + \sqrt{\Phi_a^2 + 8(L_q - L_d)^2 I_s^2}}{4(L_q - L_d)I_s}\right) \quad (1)$$

A d-axis current $i_d$ is determined as in Expression (3) using Expression (2), which shows the relationship between currents.

$$I_s = \sqrt{i_d^2 + i_q^2}, \; i_d = -I_s\sin\beta, \; i_q = I_s\cos\beta \quad (2)$$

$$i_d = \frac{\Phi_a}{2(L_q - L_d)} - \sqrt{\frac{\Phi_a^2}{4(L_q - L_d)^2} + i_q^2} \quad (3)$$

Japanese Unexamined Patent Application Publication No. 2003-259680, for example, proposes the following method. That is, in the case where $I_s$ is provided as a current command value for a motor, the amplitude $I_s$ of the current command is divided into a d-axis current $i_d$ and a q-axis current $i_q$ on the basis of the phase angle $\beta$ and the relationship shown in Expression (2). Then, current control is performed for each of the d-axis current and the q-axis current. In the case where $i_q$ is provided as a q-axis current command value, $i_q$ is substituted into Expression (3) to obtain $i_d$ as a d-axis current command value. Then, current control is performed for each of the d-axis current and the q-axis current.

The current phase angle at which the maximum torque can be obtained and the relationship between the d-axis current $i_d$ and the q-axis current $i_q$ are determined in the form of a data table through direct calculations or from motor parameters, and are used to calculate the d-axis current command value and the q-axis current command value for obtaining the maximum torque.

In addition, Japanese Unexamined Patent Application Publication No. 2000-209886, for example, proposes a method for causing a conduction phase to approach a current phase angle corresponding to a minimum current by changing the conduction phase by a constant amount of change at a predetermined time period using voltage conduction phase information and current information with respect to the rotor position.

SUMMARY OF THE INVENTION

According to one aspect of the present invention, an alternating-current motor control apparatus includes an inverter unit, a current-command divider, a current controller, a torque-variation calculator, and a phase angle generator. The inverter unit is configured to output a command voltage to an alternating-current motor. The current-command divider is configured to divide a command current amplitude into command current components based on a phase-angle command value. The current controller is configured to control current to match a motor current flowing through the motor with the command current components to output the command voltage to the motor. The torque-variation calculator is configured to calculate a motor electric power based on the command voltage and either the motor current or the command current components and configured to calculate a torque variation based on the motor electric power. The phase angle generator is configured to generate a phase angle based on the torque variation. The phase-angle command value is equal to a sum of the phase angle and an alternating current signal.

According to another aspect of the present invention, an alternating-current motor control apparatus includes an inverter unit, a speed controller, a current-command divider, a current controller, a current-variation calculator, and a phase angle generator. The inverter unit is configured to output a command voltage to an alternating-current motor. The speed controller is configured to output a command current amplitude to make a motor speed equal to a command speed. The current-command divider is configured to divide the command current amplitude into command current components based on a phase-angle command value. The current controller is configured to control current to match a motor current flowing through the motor with the command current components to output the command voltage to the motor. The current-variation calculator is configured to calculate a current variation based on either the motor current or the command current components. The phase angle generator is configured to generate the phase-angle command value based on the current variation.

According to another aspect of the present invention, an alternating-current motor control apparatus includes an inverter unit, a torque-ripple compensator, a current-command divider, a current controller, a power-loss-variation calculator, and a phase angle generator. The inverter unit is configured to output a command voltage to an alternating-current motor. The torque-ripple compensator is configured to calculate a torque-ripple-compensation current value using a speed of the motor. The current-command divider is configured to divide a sum of a command current amplitude and the torque-ripple-compensation current value into command current components based on a phase-angle command value. The current controller is configured to control current to match a motor current flowing through the motor with the command current components to output the command voltage to the motor. The power-loss-variation calculator is configured to calculate a motor electric power based on the command voltage and either the motor current or the command current components and configured to calculate a power loss variation based on the motor electric power. The phase angle generator is configured to generate a phase angle based on the power loss variation. The phase-angle command value is equal to a sum of the phase angle and an alternating current signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
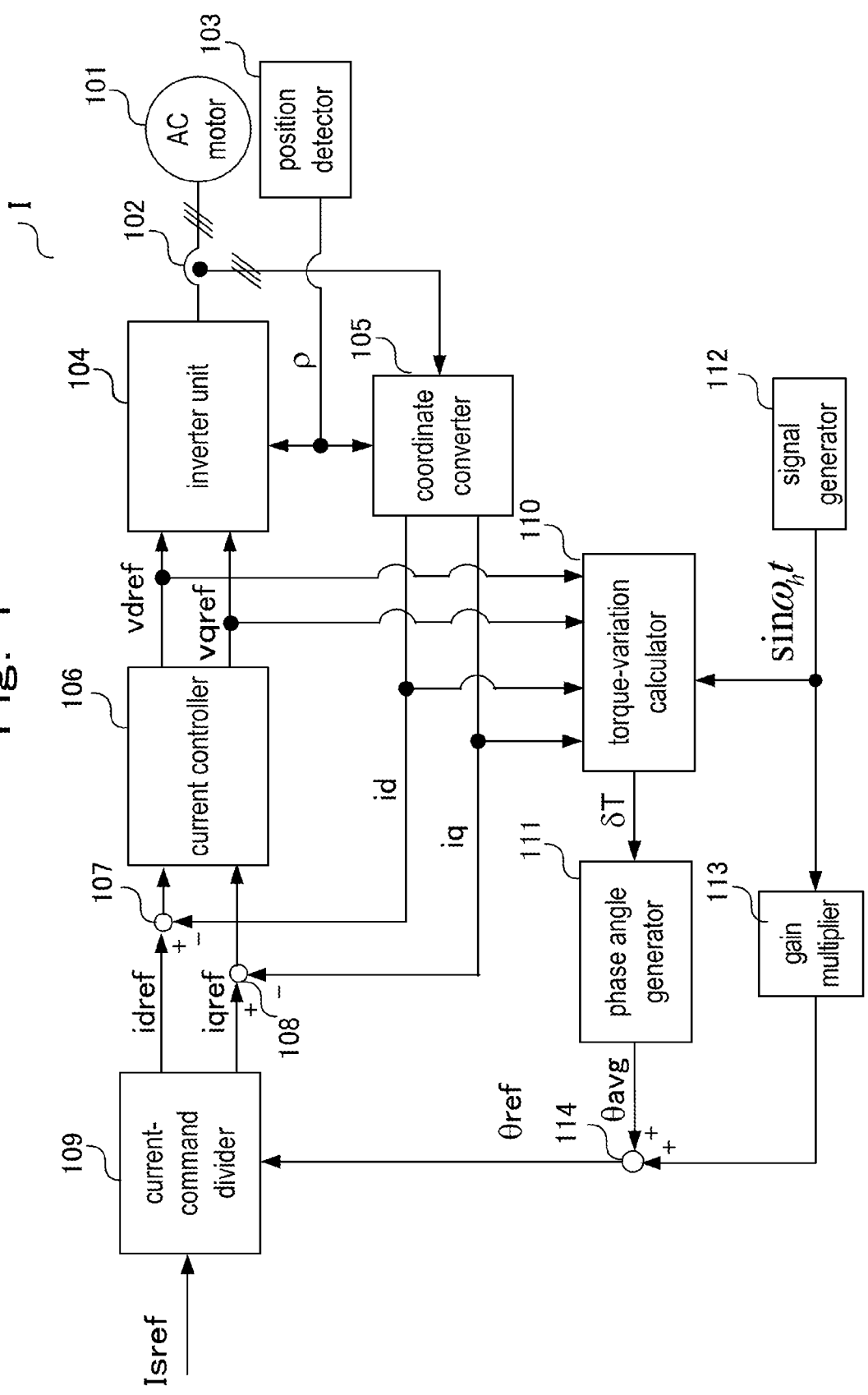
FIG. 1 is a block diagram illustrating an alternating-current motor control apparatus according to a first embodiment.

Embodiments will now be described with reference to the accompanying drawings, wherein like reference numerals designate corresponding or identical elements throughout the various drawings.

FIG. 1 is a block diagram illustrating an alternating-current motor control apparatus I according to a first embodiment of the present invention.

The alternating-current motor control apparatus I includes an alternating-current motor 101 which serves as a load, a current detector 102 which detects phase currents that flow through the motor 101, and a position detector 103 which detects a position of the motor 101.

The alternating-current motor control apparatus I also includes an inverter unit 104 and a coordinate converter 105. The inverter unit 104 applies voltage command values ($v_{dref}$, $v_{qref}$), which will be described below, to the motor 101. The coordinate converter 105 converts the detected phase currents into a current component $i_d$ in a magnetic-flux direction (d-axis) of the motor 101 and a current component $i_q$ in a direction perpendicular to the magnetic-flux direction (q-axis).

The alternating-current motor control apparatus I also includes a current controller 106 and subtractors 107 and 108. The current controller 106 outputs voltage command values ($v_{dref}$, $v_{qref}$) by performing a control process for reducing a difference $\Delta i_d$ between a d-axis current command value $i_{dref}$ and a detected current value $i_d$ and a difference $\Delta i_q$ between a q-axis current command value $i_{qref}$ and a detected current value $i_q$ to zero. The d-axis current command value $i_{dref}$ and the q-axis current command value $i_{qref}$ are output by a current-command divider 109, which will be described below. The subtractor 107 outputs the difference $\Delta i_d$ by subtracting the detected current value $i_d$ from the d-axis current command value $i_{dref}$. The subtractor 108 outputs the difference $\Delta i_q$ by subtracting the detected current value $i_q$ from the q-axis current command value $i_{qref}$.

The alternating-current motor control apparatus I also includes the current-command divider 109 and a torque-variation calculator 110. The current-command divider 109 divides a given current-amplitude command value $I_{sref}$ into current command values ($i_{dref}$, $i_{qref}$) for the d-axis and q-axis, respectively, based on a phase-angle command value $\theta_{ref}$. The torque-variation calculator 110 calculates a torque variation $\delta T$.

The alternating-current motor control apparatus I also includes a phase angle generator 111 which generates a phase angle $\theta_{avg}$ based on the torque variation $\delta T$, a signal generator 112 which outputs a search signal $\sin \omega_h t$, a gain multiplier 113 which outputs a signal obtained by multiplying the search signal $\sin \omega_h t$ by $A_{mag}$, and an adder 114 which outputs the phase-angle command value $\theta_{ref}$ obtained by adding the output from the gain multiplier 113 and the phase angle $\theta_{avg}$.

In maximum torque control according to the present embodiment, an alternating search signal is superposed on a current phase angle $\theta$ (hereinafter also referred to simply as a phase angle $\theta$), and a current vector under the condition that a constant torque T can be generated is controlled at a phase angle that eliminates the partial differential of the current amplitude with respect to the phase angle $\theta$. In addition, current control is performed by dividing the current vector into d-axis and q-axis components at the phase angle $\theta$, so that the control operation can be performed with a minimum current with respect to the torque to be generated. In other words, the operating point at which the torque can be maximized with respect to a constant output current is the point at which the partial differential of the generated torque with respect to the phase angle $\theta$ is equal to zero ($\partial T/\partial \theta = 0$). According to the present embodiment, the current control is performed at this operating point.

The optimum current phase angle $\beta$ obtained by Expression (1) and the phase angle $\theta$, which will be described below, satisfy the relationship $\beta = 90° - \theta$.

A method for achieving the maximum torque control using the search signal $\sin \omega_h t$ superposed on the phase angle $\theta$ will now be described with reference to the actual expressions.

When $\theta_{avg}$ is the phase angle before the search signal $\sin \omega_h t$ is superposed thereon and $A_{mag}$ and $\omega_h$ are the amplitude and the angular frequency, respectively, of the search signal $\sin \omega_h t$, the phase angle $\theta$ after the superposition is obtained as follows:

$$\theta = \theta_{avg} + A_{mag} \sin \omega_h t \quad (4)$$

When the current $I_s$ is divided at this phase angle $\theta$, the d-axis current $i_d$ and the q-axis current $i_q$ can be calculated as follows:

$$i_d = I_s \cos\theta = I_s \cos(\theta_{avg} + A_{mag} \sin \omega_h t)\ i_q = I_s \sin\theta = I_s \sin(\theta_{avg} + A_{mag} \sin \omega_h t) \quad (5)$$

If the amplitude $A_{mag}$ of the search signal is sufficiently small, the following expression can be derived:

$$\cos(A_{mag} \sin \omega_h t) \cong 1,\ \sin(A_{mag} \sin \omega_h t) \cong A_{mag} \sin \omega_h t \quad (6)$$

When Expression (6) is substituted into Expression (5), the d-axis current $i_d$ and the q-axis current $i_q$ can be calculated as follows:

$$i_d = I_s\cos(\theta_{avg} + A_{mag}\sin\omega_h t) \quad (7)$$
$$= I_s\{\cos\theta_{avg}\cos(A_{mag}\sin\omega_h t) - \sin\theta_{avg}\sin(A_{mag}\sin\omega_h t)\}$$
$$\cong I_s\cos\theta_{avg} - I_s A_{mag}\sin\omega_h t \cdot \sin\theta_{avg}$$

$$i_q = I_s\sin(\theta_{avg} + A_{mag}\sin\omega_h t)$$
$$= I_s\{\sin\theta_{avg}\cos(A_{mag}\sin\omega_h t) + \cos\theta_{avg}\sin(A_{mag}\sin\omega_h t)\}$$
$$\cong I_s\sin\theta_{avg} + I_s A_{mag}\sin\omega_h t \cdot \cos\theta_{avg}$$

A motor electric power $P_e$ can be calculated as the inner product of the voltage v and the current $I_s$ as follows:

$$P_e = v_d i_d + v_q i_q \quad (8)$$

When Expression (9), which shows voltage-current equations of the motor, is substituted into Expression (8), the motor electric power $P_e$ can be calculated as in Expression (10).

$$v_d = R_s i_d + L_d \frac{di_d}{dt} - \omega L_q i_q \quad (9)$$
$$v_q = R_s i_q + L_q \frac{di_q}{dt} + \omega L_d i_d + \omega \Phi_a$$

$$P_e = R_s(i_d^2 + i_q^2) + L_d \frac{di_d}{dt} i_d + L_q \frac{di_q}{dt} i_q + \omega(L_d - L_q) i_d i_q + \omega \Phi_a i_q \quad (10)$$

In Expression (10), the first term shows a copper loss, the second and third terms show reactive power, and the fourth and fifth terms show the mechanical output of the motor. The copper loss, the reactive power, and the mechanical output of the motor can be further calculated as follows:

$$R_s(i_d^2 + i_q^2) = R_s I_s^2(1 + A_{mag}^2 \sin^2\omega_h t) \quad (11)$$
$$= R_s I_s^2 + \frac{R_s I_s^2 A_{mag}^2}{2}(1 - \cos 2\omega_h t)$$

$$L_d \frac{di_d}{dt} i_d + L_q \frac{di_q}{dt} i_q = -(L_d - L_q) I_s^2 A_{mag} \omega_h \frac{1}{2}\sin 2\theta_{avg}\cos\omega_h t + \quad (12)$$
$$\frac{1}{2}(L_d \sin^2\theta_{avg} + L_q \cos^2\theta_{avg}) I_s^2 A_{mag} \omega_h \sin 2\omega_h t$$

$$\omega(L_d - L_q) i_d i_q + \omega \Phi_a i_q = \quad (13)$$
$$\left\{\omega(L_d - L_q) I_s^2 \frac{1}{2}\sin 2\theta_{avg}\left(1 - \frac{A_{mag}}{2}\right) + \omega \Phi_a I_s \sin\theta_{avg}\right\} +$$
$$\frac{1}{4}\omega(L_d - L_q) I_s^2 A_{mag}^2 \frac{1}{2}\sin 2\theta_{avg}\cos 2\omega_h t +$$
$$\{(L_d - L_q) I_s^2 \cos 2\theta_{avg} + \Phi_a I_s \cos\theta_{avg}\}\omega A_{mag}\sin\omega_h t$$

The torque T generated by the motor can be expressed using the number of pole pairs $PP_n$ in the motor as follows:

$$T = pp_n\{(L_d - L_q) i_d i_q + \Phi_a i_q\} \quad (14)$$

When Expression (7) is substituted into Expression (14) and a variation in the generated torque T per phase angle $\theta_{avg}$ (partial differential) is calculated, the following expression can be derived:

$$\frac{\partial T}{\partial \theta} = \frac{\partial}{\partial \theta} pp_n\{(L_d - L_q) I_s^2 \sin\theta_{avg}\cos\theta_{avg} + \Phi_a I_s \sin\theta_{avg}\} \quad (15)$$
$$= pp_n\{(L_d - L_q) I_s^2 \cos 2\theta_{avg} + \Phi_a I_s \cos\theta_{avg}\}$$

When the amplitude of $\sin \omega_h t$ in the mechanical output shown in Expression (13) is $\delta T$, the following expression can be obtained using Expression (15):

$$\delta T = \frac{\omega A_{mag}}{pp_n} \frac{\partial T}{\partial \theta} \quad (16)$$

Expression (16) shows that the torque variation with respect to the phase angle θ can be determined if δT can be extracted.

Therefore, first, a signal component in a frequency range around $f_h$ (=$\omega_h/2\pi$) is extracted from the motor electric power $P_e$ using a band-pass filter (BPF). As shown in Expression (17), the thus-extracted component of the motor electric power $P_e$ in the frequency range around $f_h$ includes not only δT (second term) but also a part of the reactive power (first term) shown in Expression (12).

$$(fh \text{ frequency component}) = \quad (17)$$
$$-(L_d - L_q) I_s^2 A_{mag}\omega_h \frac{1}{2}\sin 2\theta_{avg}\cos\omega_h t + \delta T \sin\omega_h t$$

Therefore, to extract only the sine-wave signal component with the same frequency as $\sin \omega_h t$, each term of Expression (17) is multiplied by $\sin \omega_h t$.

$$(fh \text{ frequency component}) \times \sin\omega_h t = -(L_d - L_q) I_s^2 A_{mag}\omega_h \frac{1}{2}\sin 2\theta_{avg} \quad (18)$$
$$\cos\omega_h t \sin\omega_h t + \delta T \sin^2\omega_h t$$
$$= -(L_d - L_q) I_s^2 A_{mag}\omega_h \frac{1}{4}\sin 2\theta_{avg}$$
$$\sin 2\omega_h t + \delta T(1 - \cos^2\omega_h t)$$

Referring to Expression (18), it is clear that δT is the only linear component. Therefore, δT can be extracted by applying a low-pass filter (LPF). Expression (18) can be transformed into Expression (19) by using a function LPF[ ] that shows the function of the low pass filter.

$$LPF[(fh \text{ frequency component}) \times \sin\omega_h t] = \delta T \quad (19)$$

The maximum torque control can be achieved by generating a phase angle θ at which δT can be set to zero. The basic principle of the embodiments of the present invention is to determine the phase angle θ in the above-described manner.

Figure 2:
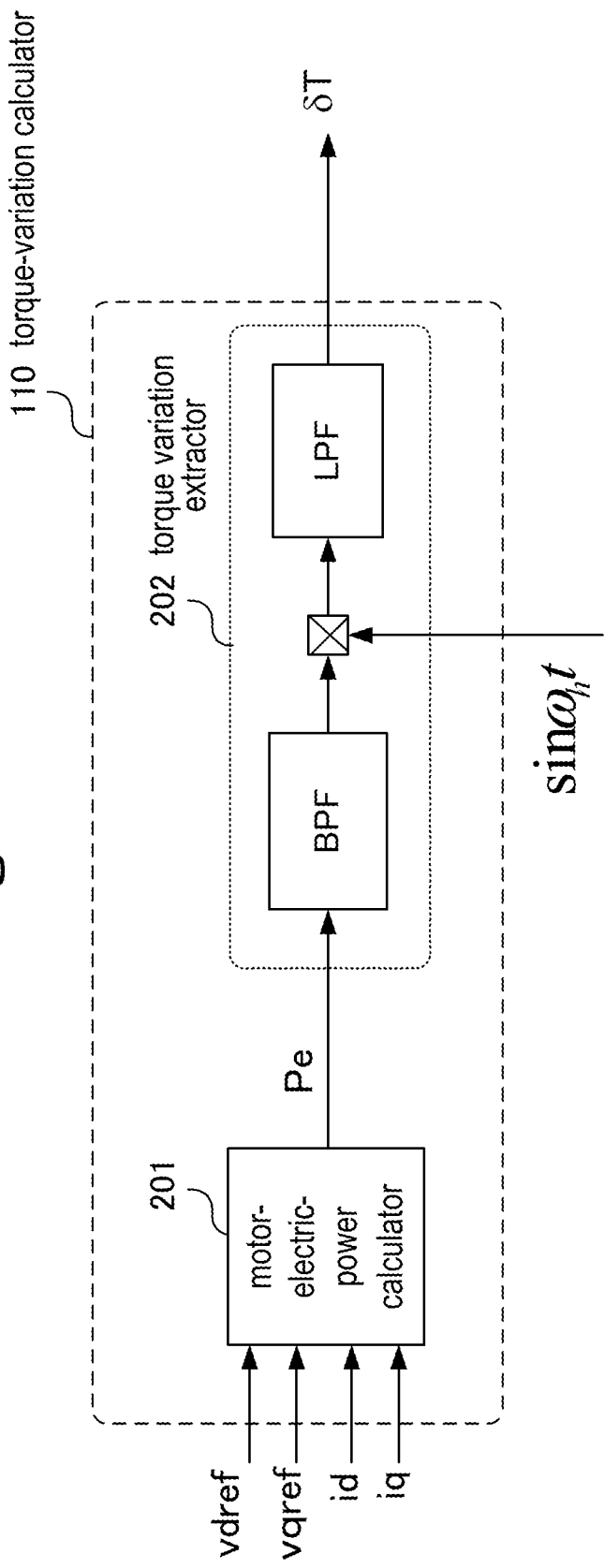
FIG. 2 is a diagram illustrating a torque-variation calculator according to the first embodiment.

FIG. 2 is a control block diagram of the torque-variation calculator 110. The torque-variation calculator 110 includes a motor-electric-power calculator 201 and a torque variation extractor 202.

The motor-electric-power calculator 201 receives the voltage command values $v_{dref}$ and $v_{qref}$ and the detected current components $i_d$ and $i_q$, and calculates the motor electric power $P_e$ from Expression (8).

The torque variation extractor 202 includes a band-pass filter (BPF) for extracting a component with the same frequency $f_h$ as that of the search signal $\sin \omega_h t$, a multiplier for multiplying a signal extracted by the band-pass filter (BPF) by the search signal $\sin \omega_h t$, and a low-pass filter (LPF) for extracting only a linear component from the result of multiplication.

The torque variation extractor 202 receives the motor electric power $P_e$ and the search signal $\sin \omega_h t$ and extracts the component δT proportional to the variation in torque per phase angle $\theta_{avg}$ based on the calculations of Expressions (17), (18), and (19) described above in the explanation of the basic principle of the embodiments of the present invention. Then, δT is output as the output from the torque-variation calculator 110.

Further explanation will be given with reference to FIG. 1.

The phase angle generator 111 is a controller configured as an integrator capable of adjusting a convergence time. The phase angle generator 111 outputs the phase angle $\theta_{avg}$ by performing a control process for reducing the torque variation ΔT output by the torque-variation calculator 110 to zero. The phase angle generator 111 includes a proportional integrator and a proportional integrator-differentiator, and the convergence time may be adjusted by adequately setting a controller gain and an integral time constant.

Thus, the phase angle generator 111 reliably achieves convergence on the operating point at which the torque variation per phase angle $\theta_{avg}$ is reduced to zero within a convergence time that is short enough for the motor control operation.

The adder 114 adds the output from the gain multiplier 113, which outputs the result of multiplication of the search signal sin $\omega_h t$ and $A_{mag}$, to the phase angle $\theta_{avg}$, and outputs the thus-obtained phase-angle command value $\theta_{ref}$ for achieving the maximum torque control to the current-command divider 109.

The frequency $f_h$ of the search signal sin $\omega_h t$ is preferably set to, for example, a value between response frequencies of the current control and another control so that the frequency $f_h$ is not equal to any of the response frequencies of other controllers and does not affect the motor driving operation.

Accordingly, the alternating-current motor control apparatus I performs a high-efficiency motor control operation in which the current phase angle is caused to quickly converge at the operating point corresponding to the maximum torque without performing direct calculations based on parameters or using a table and which is not influenced by variations in the motor parameters.

Figure 3:
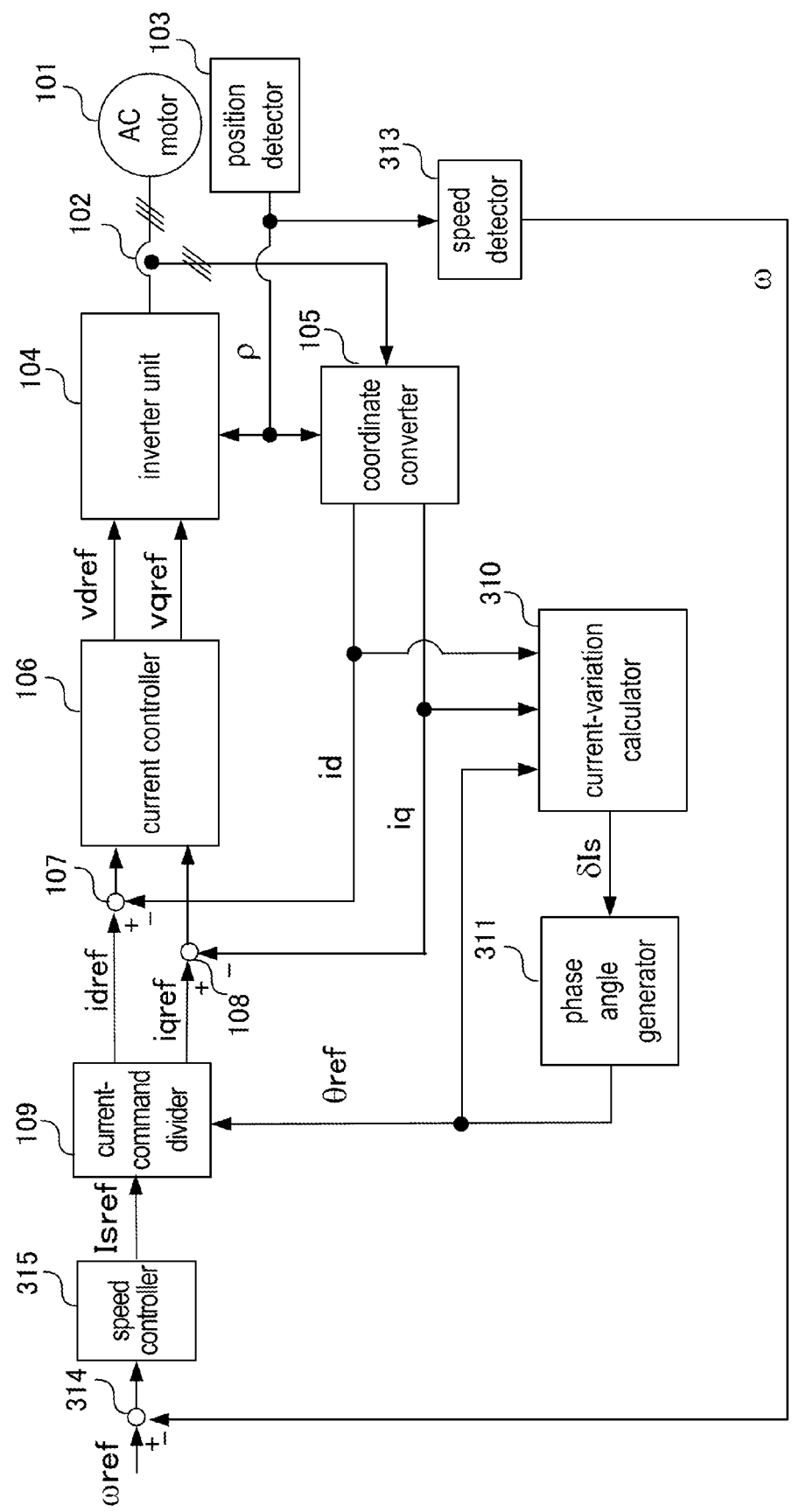
FIG. 3 is a block diagram illustrating an alternating-current motor control apparatus according to a second embodiment.

FIG. 3 is a block diagram illustrating an alternating-current motor control apparatus J according to a second embodiment. In the first embodiment, current control is performed in response to a given current command, and a phase angle corresponding to a maximum torque is determined. In the second embodiment, speed control is performed in response to a given speed command. Then, current control is performed in response to a current command for maintaining a torque for obtaining a constant speed with respect to load, and a phase angle corresponding to a minimum current is determined.

In accordance with the above-described difference between the first and second embodiments, the alternating-current motor control apparatus J according to the second embodiment includes a speed detector 313, a subtractor 314, and a speed controller 315 in addition to the structure of the alternating-current motor control apparatus I according to the first embodiment. In addition, a current-variation calculator 310 is provided in place of the torque-variation calculator 110, and the signal generator 112, the gain multiplier 113, and the adder 114 are omitted. Components similar to those in the first embodiment are denoted by the same reference numerals, and explanations thereof are thus omitted.

A phase angle generator 311 has basically the same structure as that of the phase angle generator 111 except that the input and output signals are different from those of the phase angle generator 111. In the second embodiment, the signal generator 112, the gain multiplier 113, and the adder 114 can be omitted because the current variation used to calculate the phase angle can be obtained directly from the current detected by the current detector 102.

The speed detector 313 determines the speed ω by differentiating the position detected by the position detector 103.

The speed controller 315 receives a difference between the speed ω and a given speed command value $\omega_{ref}$ calculated by the subtractor 314, and outputs a current command $I_{sref}$ by performing a control process for reducing the difference to zero. A proportional integrator, a proportional integrator-differentiator, or the like is used to control and calculate the current command $I_{sref}$.

Figure 4:
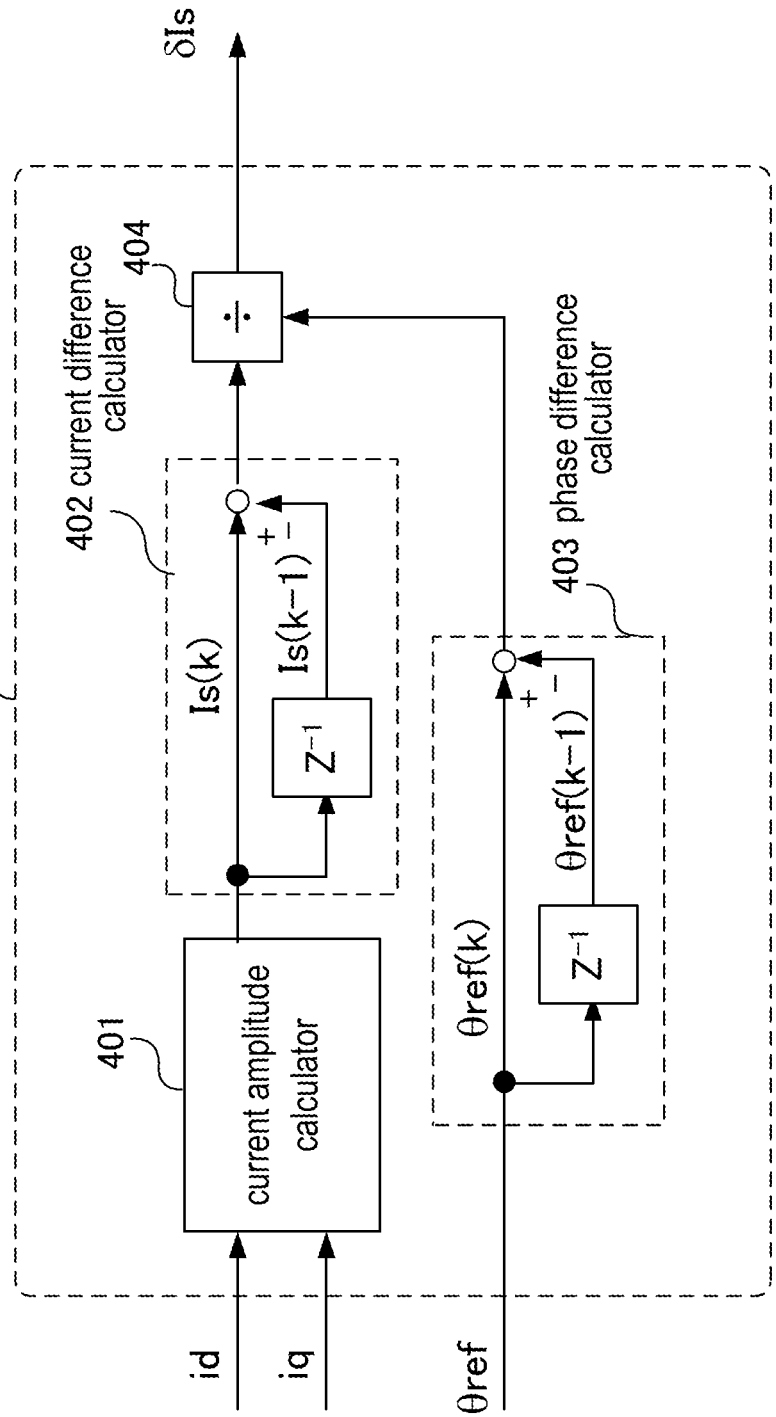
FIG. 4 is a diagram illustrating a current-variation calculator according to the second embodiment.

FIG. 4 is a control block diagram of the current-variation calculator 310. The current-variation calculator 310 includes a current amplitude calculator 401, a current difference calculator 402, a phase difference calculator 403, and a divider 404.

The current amplitude calculator 401 calculates the current amplitude $I_s$ based on the d-axis and q-axis current components $i_d$ and $i_q$ input thereto using the following expression:

$$I_s = \sqrt{i_d^2 + i_q^2} \tag{20}$$

The current difference calculator 402 calculates the difference between the current amplitude $I_s(k-1)$ calculated in the previous calculation cycle and the current amplitude $I_s(k)$ calculated in the current calculation cycle, and outputs the difference as a current amplitude difference.

The phase difference calculator 403 stores the phase-angle command value $\theta_{ref}(k-1)$ input in the previous cycle, and calculates the difference between the phase-angle command value $\theta_{ref}(k-1)$ input in the previous cycle and the phase-angle command value $\theta_{ref}(k)$ input in the current cycle as a phase angle difference.

The divider 404 divides the current amplitude difference by the phase angle difference, and calculates the current variation $\delta I_s$ per phase-angle command value $\theta_{ref}$ as follows:

$$\delta I_s = \frac{I_s(k) - I_s(k-1)}{\theta_{ref}(k) - \theta_{ref}(k-1)} \tag{21}$$

The result of the calculation is output to the phase angle generator 311.

Further explanation will be given with reference to FIG. 3.

Similar to the phase angle generator 111, the phase angle generator 311 is a controller configured as an integrator that can adjust a convergence time. The phase angle generator 311 outputs the phase-angle command value $\theta_{ref}$ by performing a control process fore reducing the current variation $\delta I_s$ output by the current-variation calculator 310 to zero. The phase angle generator 311 includes a proportional integrator or a proportional integrator-differentiator, and the convergence time may be adjusted by adequately setting a controller gain and an integral time constant such that the convergence time is short enough for the motor control operation.

Accordingly, the alternating-current motor control apparatus J performs a high-efficiency motor control operation in which convergence of the current phase angle on the operating point corresponding to the minimum current is quickly achieved without performing direct calculations based on motor parameters or using a function table and which is not influenced by variation in the motor parameters.

Figure 5:
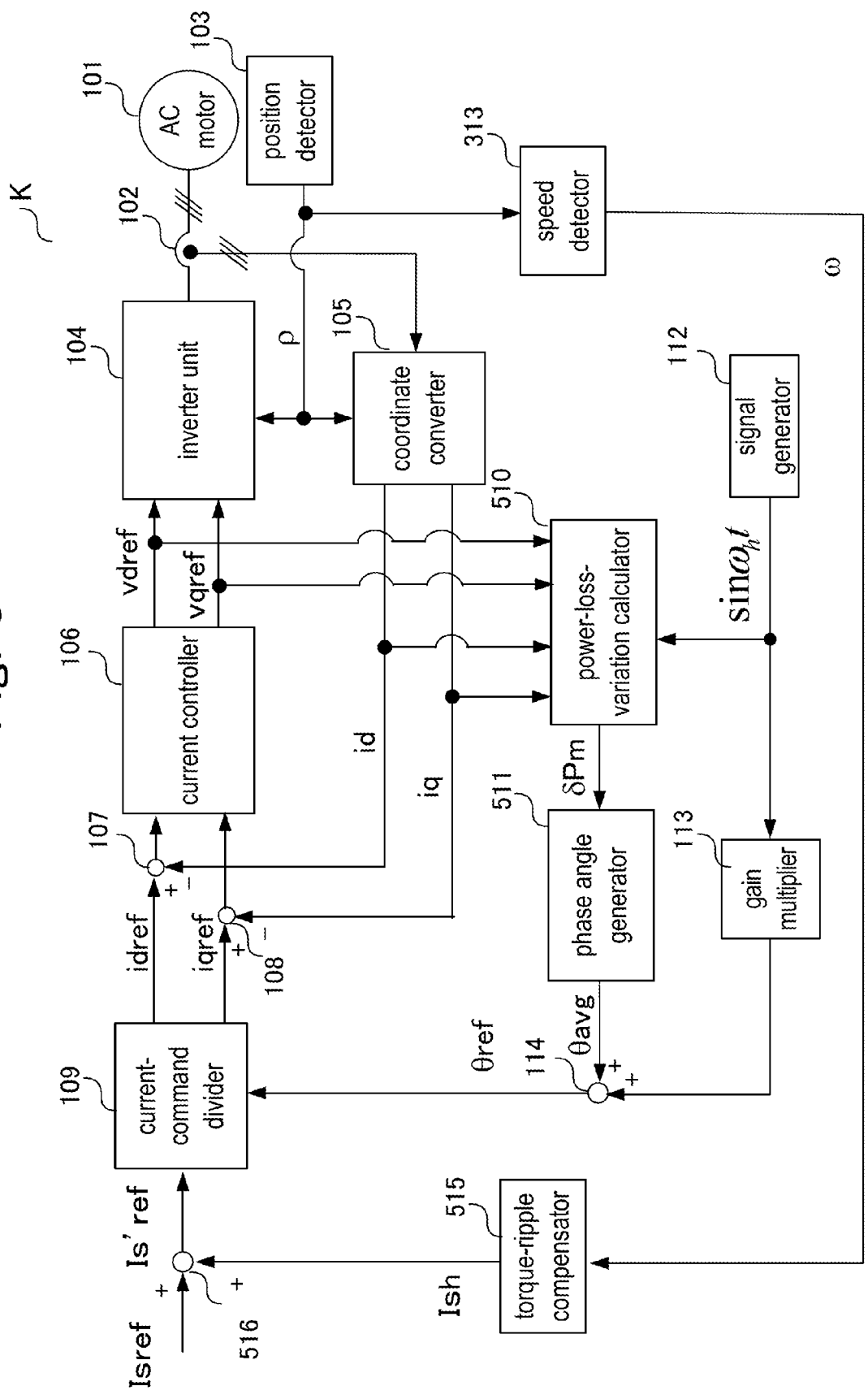
FIG. 5 is a block diagram illustrating an alternating-current motor control apparatus according to a third embodiment.

FIG. 5 is a block diagram illustrating an alternating-current motor control apparatus K according to a third embodiment. According to the first embodiment, the phase angle corresponding to the maximum torque is determined. In the third embodiment, a phase angle corresponding to minimum power loss is determined.

In accordance with the above-described difference between the first and third embodiments, the alternating-current motor control apparatus K according to the third embodiment includes a speed detector 313, a torque-ripple compensator 515, and an adder 516 in addition to the structure of the alternating-current motor control apparatus I according to the first embodiment. Components similar to those in the first embodiment are denoted by the same reference numerals, and explanations thereof are thus omitted.

Although a power-loss-variation calculator 510 has the same structure as that of the torque-variation calculator 110, an output signal from the power-loss-variation calculator 510 differs from that from the torque-variation calculator 110 owing to the operation of the torque-ripple compensator 515. Accordingly, although a phase angle generator 511 has the same structure as that of the phase angle generator 111, an input signal input to the phase angle generator 511 differs from that input to the phase angle generator 111. Therefore, the above-mentioned components are denoted by reference numerals different from those in the first embodiment.

In the third embodiment, maximum-efficiency control is achieved in consideration with an iron loss in the motor.

When the iron loss Pi in the motor is taken into account, the electric power $P_e$ in Expression (10) can be expressed using a copper loss $P_c$, a mechanical output $P_t$, and a mechanical output variation $\delta P_t$ and a power-loss variation $\delta P_m$ that vary in accordance with a search signal as follows:

$$P_e = P_c + P_i + P_t + \delta P_m + \delta P_t \quad (22)$$

The mechanical output variation $\delta P_t$ is proportional to the torque variation described in the first embodiment ($\delta P_t \propto \delta T$). The power-loss variation $\delta P_m$ is negligibly small compared to the mechanical output variation $\delta P_t$ when the iron loss is zero, but is large relative to the mechanical output variation $\delta P_t$ and is not negligible when the iron loss is large. In the case where the first embodiment is applied to a motor having a large iron loss, the extracted torque variation is influenced by the power-loss variation. Therefore, the operating point corresponding to the maximum torque becomes different from the operating point corresponding to the maximum efficiency.

Therefore, to more accurately achieve the maximum efficiency, according to the third embodiment, minimum power-loss control is performed instead of the maximum torque control. To perform the minimum power-loss control, the torque-ripple compensator 515, which eliminates the torque variation determined from the speed, is added to an external loop of the current controller 106.

As a result, the mechanical output variation $\delta P_t$ is set to zero. Therefore, the power-loss variation $\delta P_m$ is output as the output signal from the power-loss-variation calculator 510, although the structure of the power-loss-variation calculator 510 is exactly the same as that of the torque-variation calculator 110.

In the first embodiment, the phase angle $\theta_{avg}$ at which the torque variation $\delta T$ obtained by Expression (19) can be set to zero is generated. Similarly, in the third embodiment, the power-loss variation $\delta P_m$ is calculated as follows:

$$\delta P_m = LPF[(\text{fh frequency component in } P_e) \times \sin \omega_h t] \quad (23)$$

The basic principle of the third embodiment is to achieve the maximum efficiency by minimum power loss control by generating the phase angle $\theta_{avg}$ at which the power-loss variation $\delta P_m$ can be reduced to zero.

Figure 6:
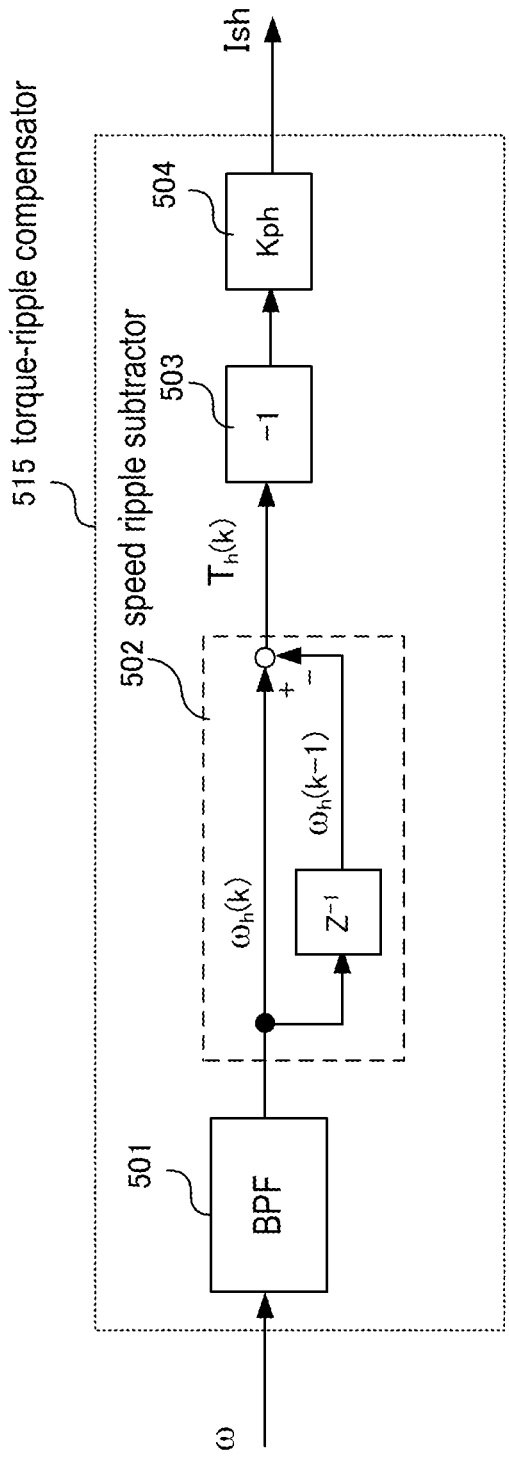
FIG. 6 is a diagram illustrating a current-variation calculator according to a third embodiment.

FIG. 6 is a control block diagram of the torque-ripple compensator 515. The torque-ripple compensator 515 includes a band-pass filter (BPF) 501, a speed ripple subtractor 502, a sign reverser 503, and a torque ripple controller 504.

The band-pass filter (BPF) 501 extracts a component with the same frequency fh as that of the search signal $\sin \omega_h t$ from the detected speed $\omega$.

The speed ripple subtractor 502 calculates the difference between the speed ripple $\omega h(k-1)$ calculated in the previous calculation cycle and the speed ripple $\omega h(k)$ calculated in the current calculation cycle, and outputs the difference as a signal Th(k) that is proportional to the torque ripple.

The sign reverser 503 reverses the sign of the signal Th(k) that is proportional to the torque ripple.

The torque ripple controller 504 is a controller configured as an integrator that can adjust a convergence time. The torque ripple controller 504 outputs a torque ripple compensation current Ish by performing a control process for reducing the signal Th(k) proportional to the torque ripple to zero. The torque ripple controller 504 includes a proportional integrator or a proportional integrator-differentiator, and the convergence time may be adjusted by a controller gain and an integral time constant.

Further explanation will be given with reference to FIG. 5.

The adder 516 adds the torque ripple compensation current Ish output by the torque-ripple compensator 515 to the current command $I_{sref}$ and outputs a new current command $I_{s'ref}$.

The phase angle generator 511 is a controller structured as an integrator capable of adjusting a convergence time. The phase angle generator 511 outputs a phase angle $\theta_{avg}$ by performing a control process for reducing the power-loss variation $\delta P_m$ output by the power-loss-variation calculator 510 to zero. The phase angle generator 511 includes a proportional integrator or a proportional integrator-differentiator, and the convergence time may be adjusted by a controller gain and an integral time constant.

Thus, the phase angle generator 511 reliably achieves convergence on the operating point at which the power loss variation per phase angle $\theta_{avg}$ is reduced to zero within a convergence time that is short enough for the motor control operation.

The adder 114 adds the output from the gain multiplier 113, which outputs the result of multiplication of the search signal $\sin \omega_h t$ and $A_{mag}$, to the phase angle $\theta_{avg}$, and outputs the thus-obtained phase-angle command value $\theta_{ref}$ for achieving the minimum power loss control to the current-command divider 109.

Accordingly, the alternating-current motor control apparatus K according to the third embodiment performs a high-efficiency motor control operation in which convergence of the current phase angle on the operating point corresponding to the minimum power loss is quickly achieved without performing direct calculations based on motor parameters or using a function table and which is not influenced by variation in the motor parameters.

Figure 7:
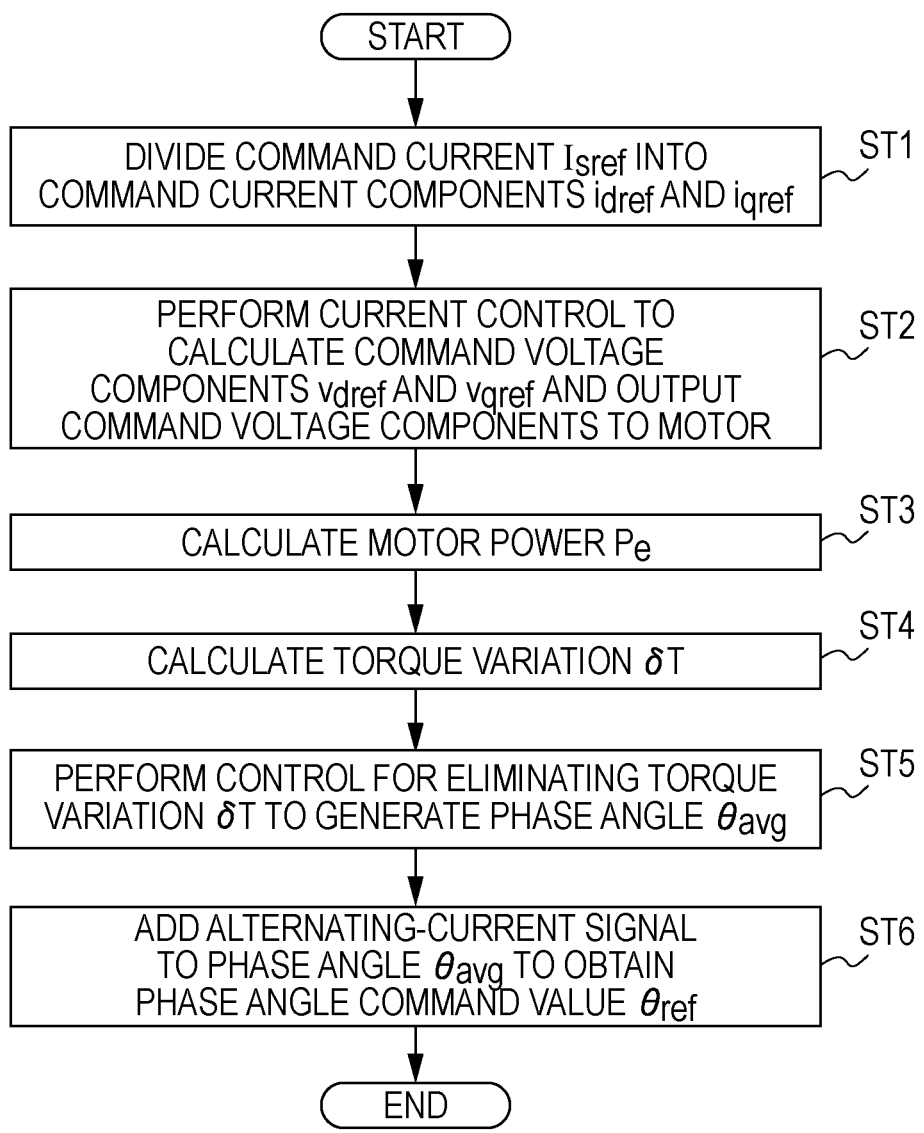
FIG. 7 is a flowchart of a control method for the alternating-current motor control apparatus shown in FIG. 1 according to a fourth embodiment.

FIG. 7 is a flowchart of a control method for the alternating-current motor control apparatus I according to a fourth embodiment. Each step in the flowchart will now be described.

In step ST1, the current-command divider 109 receives the command current $I_{sref}$ and divides the command current $I_{sref}$ into command current components $i_{dref}$ and $i_{qref}$ at the phase-angle command value $\theta_{ref}$. The phase-angle command value $\theta_{ref}$ used in this step is the value obtained in step ST6, which will be described below, in the previous calculation cycle.

Next, in step ST2, the current controller 106 calculates the command voltage components $v_{dref}$ and $v_{qref}$ by performing current control for making the motor current components $i_d$ and $i_q$ equal to the command current components $i_{dref}$ and $i_{qref}$, respectively, and outputs the command voltage components $v_{dref}$ and $v_{qref}$ to the motor 101 through the inverter unit 104. The motor current components $i_d$ and $i_q$ are based on the d-q coordinate system obtained by coordinate conversion of the phase currents of the motor 101 detected by the current detector 102. The coordinate conversion is performed by the coordinate converter 105.

Next, in step ST3, the motor electric power $P_e$ is calculated based on the command voltage components $v_{dref}$ and $v_{qref}$ calculated in step ST2 and the motor current components $i_d$ and $i_q$.

Next, in step ST4, the torque variation $\delta T$ is calculated based on the motor electric power $P_e$ and an alternating current signal, which will be described below in the explanation of step ST6. Step ST4 includes a step of extracting a signal component with the same frequency as that of the alternating current signal, which will be described below in the explanation of step ST6, from the motor electric power $P_e$, a step of multiplying the extracted signal component by the alternating current signal and a step of extracting a linear component from the result of the multiplication. Steps ST3 and ST4 are performed by the torque-variation calculator 110.

Next, in step ST5, the phase angle generator 111 generates the phase angle $\theta_{avg}$ by performing a control process for reducing the torque variation $\delta T$ to zero.

Next, in step ST6, the adder 114 outputs the phase-angle command value $\theta_{ref}$ by adding the alternating current signal to the phase angle $\theta_{avg}$.

The details of the above-described processes are described in the first embodiment, and therefore explanations thereof will be omitted in the present embodiment.

The control method for the alternating-current motor control apparatus according to the fourth embodiment of the present invention is performed in the above-described manner. Therefore, effects similar to those of the first embodiment can also be obtained in the fourth embodiment. The order in which the steps are performed is not limited to the above-described example.

Figure 8:
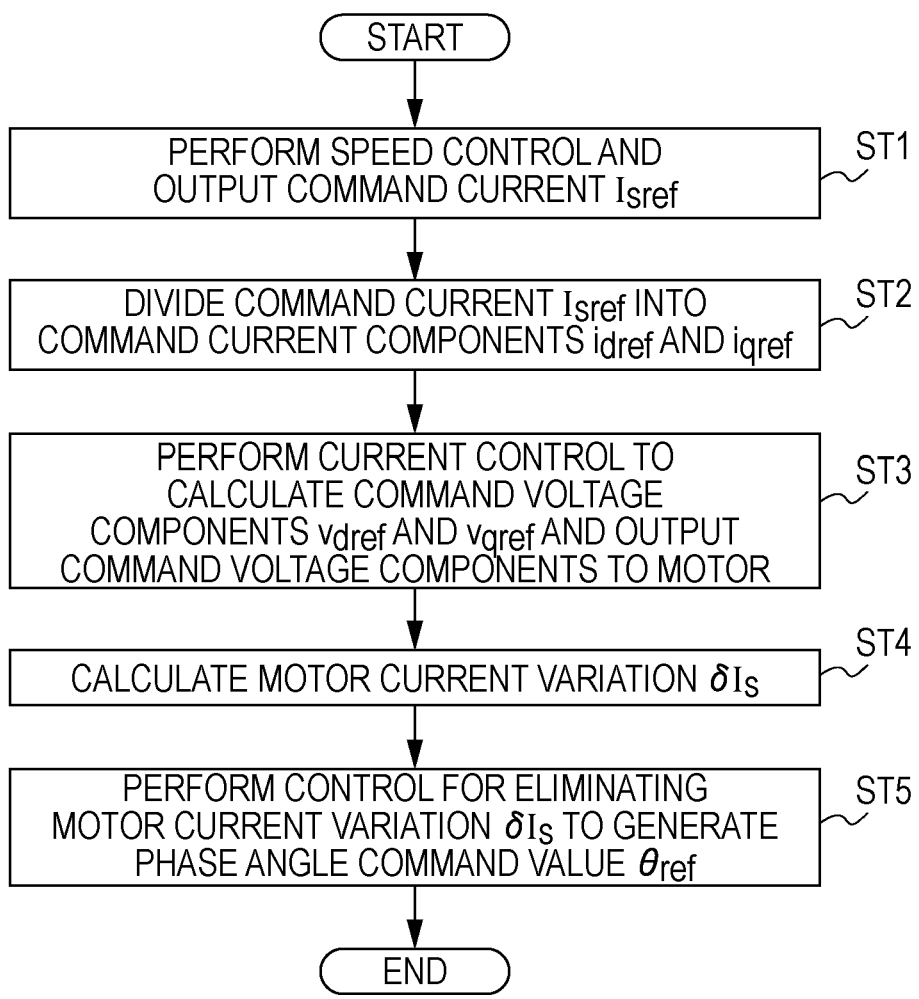
FIG. 8 is a flowchart of a control method for the alternating-current motor control apparatus shown in FIG. 3 according to a fifth embodiment.

FIG. 8 is a flowchart of a control method for the alternating-current motor control apparatus J according to a fifth embodiment. Each step in the flowchart will now be described.

In step ST1, the speed controller 315 outputs the command current $I_{sref}$ such that the given command speed $\omega_{ref}$ becomes equal to the motor speed $\omega$.

Next, in step ST2, the current-command divider 109 divides the command current $I_{sref}$ into command current components $i_{dref}$ and $i_{qref}$ at the phase-angle command value $\theta_{ref}$. The phase-angle command value $\theta_{ref}$ used in this step is the value obtained in step ST5, which will be described below.

Next, in step ST3, the current controller 106 calculates the command voltage components $v_{dref}$ and $v_{qref}$ by performing current control for making the motor current components $i_d$ and $i_q$ equal to the command current components $i_{dref}$ and $i_{qref}$, respectively, and outputs the command voltage components $v_{dref}$ and $v_{qref}$ to the motor 101 through the inverter unit 104. The motor current components $i_d$ and $i_q$ are based on the d-q coordinate system obtained by coordinate conversion of the phase currents of the motor 101 detected by the current detector 102. The coordinate conversion is performed by the coordinate converter 105.

Next, in step ST4, the current-variation calculator 310 calculates the motor current variation $\delta I_s$ based on the motor current components $i_d$ and $i_q$ calculated in step ST3 and the phase-angle command value $\theta_{ref}$ calculated in step ST5, which will be described below. This step includes a step of calculating a change in the amplitude based on the motor current components $i_d$ and $i_q$ and a step of calculating the variation $\delta I_s$ by dividing the change in the amplitude by a change in the phase-angle command value $\theta_{ref}$.

Next, in step ST5, the phase angle generator 311 generates the phase-angle command value $\theta_{ref}$ by performing a control process for reducing the current variation $\delta I_s$ to zero.

The details of the above-described processes are described in the second embodiment, and therefore explanations thereof will be omitted in the present embodiment.

The control method for the alternating-current motor control apparatus according to the fifth embodiment of the present invention is performed in the above-described manner. Therefore, effects similar to those of the second embodiment can also be obtained in the fifth embodiment. The order in which the steps are performed is not limited to the above-described example.

Figure 9:
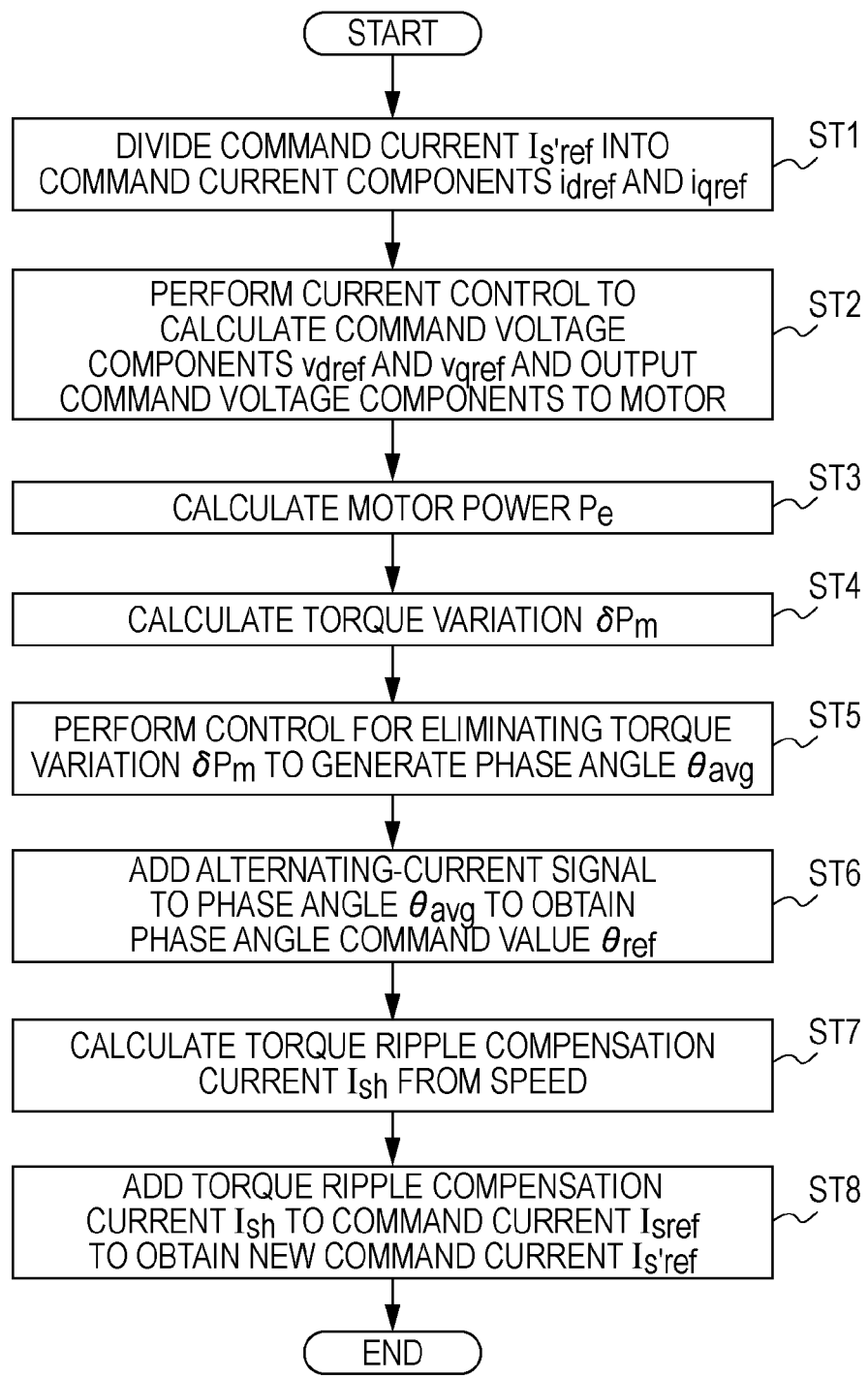
FIG. 9 is a flowchart of a control method for an alternating-current motor control apparatus according to a sixth embodiment.

FIG. 9 is a flowchart of a control method for the alternating-current motor control apparatus K according to a sixth embodiment. Each step in the flowchart will now be described.

In step ST1, the current-command divider 109 receives the command current $I_{sref}$ and divides the command current $I_{sref}$ into command current components $i_{dref}$ and $i_{qref}$ at the phase-angle command value $\theta_{ref}$. The phase-angle command value $\theta_{ref}$ used in this step is the value obtained in step ST6, which will be described below, in the previous calculation cycle.

Next, in step ST2, the current controller 106 calculates the command voltage components $v_{dref}$ and $v_{qref}$ by performing current control for making the motor current components $i_d$ and $i_q$ equal to the command current components $i_{dref}$ and $i_{qref}$, respectively, and outputs the command voltage components $v_{dref}$ and $v_{qref}$ to the motor 101 through the inverter unit 104. The motor current components $i_d$ and $i_q$ are based on the d-q coordinate system obtained by coordinate conversion of the phase currents of the motor 101 detected by the current detector 102. The coordinate conversion is performed by the coordinate converter 105.

Next, in step ST3, the motor electric power $P_e$ is calculated based on the command voltage components $v_{dref}$ and $v_{qref}$ calculated in step ST2 and the motor current components $i_d$ and $i_q$.

Next, in step ST4, the power-loss variation $\delta P_m$ is calculated based on the motor electric power $P_e$ and an alternating current signal, which will be described below in the explanation of step ST6. Step ST4 includes a step of extracting a signal component with the same frequency as that of the alternating current signal, which will be described below in the explanation of step ST6, from the motor electric power $P_e$, a step of multiplying the extracted signal component by the alternating current signal and a step of extracting a linear component from the result of the multiplication. Steps ST3 and ST4 are performed by the power-loss-variation calculator 510.

Next, in step ST5, the phase angle generator 511 generates the phase angle $\theta_{avg}$ by performing a control process for reducing the power-loss variation $\delta P_m$ to zero.

Next, in step ST6, the adder 114 outputs the phase-angle command value $\theta_{ref}$ by adding the alternating current signal to the phase angle $\theta_{avg}$.

Next, in step ST7, the torque-ripple compensator 515 calculates the torque ripple compensation current Ish from the speed $\omega$.

Next, in step ST8, the adder 516 adds the torque ripple compensation current Ish to the current command $I_{sref}$ to obtain the new current command $I_{sref}$.

The details of the above-described processes are described in the third embodiment, and therefore explanations thereof will be omitted in the present embodiment.

The control method for the alternating-current motor control apparatus according to the sixth embodiment of the present invention is performed in the above-described manner. Therefore, effects similar to those of the third embodiment can also be obtained in the third embodiment. The order in which the steps are performed is not limited to the above-described example.

The present invention is not limited to the above-described embodiments, and various modifications are possible. For example, the motor-electric-power calculator 201 according to the first and third embodiments may use a detected voltage in the case where a voltage sensor is provided. In addition, current command values $i_{dref}$ and $i_{qref}$ may be used. A similar calculation may also be performed using phase voltages and phase currents of the motor.

In addition, the speed detector 313 according to the second and third embodiments may also calculate the speed based on an electrical equation regarding the motor by using a voltage command, a detected current, etc.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An alternating-current motor control apparatus comprising:
    an inverter unit configured to output a command voltage to an alternating-current motor;
    a current-command divider configured to divide a command current amplitude into command current components based on a phase-angle command value;
    a current controller configured to control current to match a motor current flowing through the motor with the command current components to output the command voltage to the motor;
    a torque-variation calculator configured to calculate a motor electric power based on the command voltage and the motor current and configured to calculate a torque variation based on the motor electric power;
    a phase angle generator configured to generate a phase angle based on the torque variation; and
    an adder configured to add a sinusoidal signal to the phase angle to generate the phase-angle command value.

2. The alternating-current motor control apparatus according to claim 1, further comprising:
    a signal generator configured to generate a search signal having a sine wave; and
    a gain multiplier configured to multiply the search signal by a gain to generate the sinusoidal signal,
    wherein the torque-variation calculator comprises:
        a band-pass filter configured to extract a signal component from the motor electric power, the signal component having a same frequency as a frequency of the search signal;
        a multiplier configured to multiply the signal component by the search signal; and
        a low-pass filter configured to extract a linear component from a multiplication result output by the multiplier.

3. The alternating-current motor control apparatus according to claim 1, wherein the phase angle generator is configured to generate the phase angle so as to reduce the torque variation to zero.

4. The alternating-current motor control apparatus according to claim 1, further comprising:
    a signal generator configured to generate a search signal having a sine wave; and
    a gain multiplier configured to multiply the search signal by a gain to generate the sinusoidal signal,
    wherein the torque variation is calculated based on an amplitude of a component of a mechanical output included in the motor electric power, the component having a same frequency as a frequency of the search signal.

5. The alternating-current motor control apparatus according to claim 1,
    wherein the current-command divider is configured to divide the command current amplitude into a command current component for a d-axis along a magnetic-flux direction of the motor and a command current component for a q-axis that is perpendicular to the d-axis, and
    wherein the current controller is configured to control current for the command current component for the d-axis and for the command current component for the q-axis to output the command voltage to the motor.

6. The alternating-current motor control apparatus according to claim 1, further comprising:
    a signal generator configured to generate a search signal having a sine wave.

7. The alternating-current motor control apparatus according to claim 6, further comprising:
    a gain multiplier configured to multiply the search signal by a gain to generate the sinusoidal signal.

8. The alternating-current motor control apparatus according to claim 1, further comprising:
    a signal generator configured to generate a search signal having a sine wave; and
    a gain multiplier configured to multiply the search signal by a gain to generate the sinusoidal signal,
    wherein the torque-variation calculator includes a torque variation extractor configured to calculate the torque variation based on the motor electric power and the search signal.

9. An alternating-current motor control apparatus comprising:
    an inverter unit configured to output a command voltage to an alternating-current motor;
    a speed controller configured to output a command current amplitude to make a motor speed equal to a command speed;
    a current-command divider configured to divide the command current amplitude into command current components based on a phase-angle command value;
    a current controller configured to control current to match a motor current flowing through the motor with the command current components to output the command voltage to the motor;
    a current-variation calculator configured to calculate a current variation based on the phase-angle command value and the motor current; and
    a phase angle generator configured to generate the phase-angle command value based on the current variation.

10. The alternating-current motor control apparatus according to claim 9, wherein the current-variation calculator comprises:

a divider configured to divide a change in an amplitude of the motor current by a change in the phase-angle command value.

11. The alternating-current motor control apparatus according to claim 9,
wherein the phase angle generator is configured to generate the phase-angle command value so as to reduce the current variation to zero.

12. The alternating-current motor control apparatus according to claim 9,
wherein the current-command divider is configured to divide the command current amplitude into a command current component for a d-axis along a magnetic-flux direction of the motor and a command current component for a q-axis that is perpendicular to the d-axis, and
wherein the current controller is configured to control current for the command current component for the d-axis and for the command current component for the q-axis to output the command voltage to the motor.

13. The alternating-current motor control apparatus according to claim 9,
wherein the current-variation calculator is configured to store a previous phase-angle command value generated by the phase angle generator in a previous cycle,
wherein the current-variation calculator is configured to calculate, as a phase angle difference, a difference between the previous phase-angle command value and the phase-angle command value generated by the phase angle generator in a current cycle, and
wherein the current-variation calculator is configured to calculate the current variation based on the phase angle difference and the motor current.

14. An alternating-current motor control apparatus comprising:
an inverter unit configured to output a command voltage to an alternating-current motor;
a torque-ripple compensator configured to calculate a torque-ripple-compensation current value using a speed of the motor;
a current-command divider configured to divide a sum of a command current amplitude and the torque-ripple-compensation current value into command current components based on a phase-angle command value;
a current controller configured to control current to match a motor current flowing through the motor with the command current components to output the command voltage to the motor;
a power-loss-variation calculator configured to calculate a motor electric power based on the command voltage and the motor current and configured to calculate a power loss variation based on the motor electric power;
a phase angle generator configured to generate a phase angle based on the power loss variation; and
an adder configured to add a sinusoidal signal to the phase angle to generate the phase-angle command value.

15. The alternating-current motor control apparatus according to claim 14, further comprising:
a signal generator configured to generate a search signal having a sine wave; and
a gain multiplier configured to multiply the search signal by a gain to generate the sinusoidal signal,
wherein the power-loss-variation calculator comprises:
a band-pass filter configured to extract a signal component from the motor electric power, the signal component having a same frequency as a frequency of the search signal;
a multiplier configured to multiply the signal component by the search signal; and
a low-pass filter configured to extract a linear component from a multiplication result output by the multiplier.

16. The alternating-current motor control apparatus according to claim 14,
wherein the phase angle generator is configured to generate the phase angle so as to reduce the power loss variation to zero.

17. The alternating-current motor control apparatus according to claim 14, further comprising:
a signal generator configured to generate a search signal having a sine wave; and
a gain multiplier configured to multiply the search signal by a gain to generate the sinusoidal signal,
wherein the power loss variation is calculated based on an amplitude of a component of power loss included in the motor electric power, the component having a same frequency as a frequency of the search signal.

18. The alternating-current motor control apparatus according to claim 14,
wherein the current-command divider is configured to divide the command current amplitude into a command current component for a d-axis along a magnetic-flux direction of the motor and a command current component for a q-axis that is perpendicular to the d-axis, and
wherein the current controller is configured to control current for the command current component for the d-axis and for the command current component for the q-axis to output the command voltage to the motor.

* * * * *